United States Patent
Amilien et al.

(10) Patent No.: US 8,776,951 B2
(45) Date of Patent: Jul. 15, 2014

(54) LUBRICATING DEVICE AND ITS USE FOR LUBRICATING A WHEEL FLANGE OF A RAILWAY VEHICLE

(75) Inventors: Guillaume Amilien, Vivy (FR); Dominique Dalaine, Saumur (FR)

(73) Assignee: Aktiebolaget SKF, Gothenburg (SE)

( * ) Notice: Subject to any disclaimer, the term of this patent is extended or adjusted under 35 U.S.C. 154(b) by 463 days.

(21) Appl. No.: 13/126,787

(22) PCT Filed: Oct. 9, 2009

(86) PCT No.: PCT/EP2009/063154
§ 371 (c)(1),
(2), (4) Date: Jul. 1, 2011

(87) PCT Pub. No.: WO2010/094251
PCT Pub. Date: May 6, 2010

(65) Prior Publication Data
US 2011/0259670 A1    Oct. 27, 2011

(30) Foreign Application Priority Data
Oct. 31, 2008  (FR) ...................... 08 57440

(51) Int. Cl.
*F01M 5/00* (2006.01)
*B61K 3/00* (2006.01)

(52) U.S. Cl.
USPC ....................................... 184/6.22

(58) Field of Classification Search
USPC .......... 184/3.1, 3.2, 6.22; 239/135; 222/146.2
See application file for complete search history.

(56) References Cited

U.S. PATENT DOCUMENTS

| | | | |
|---|---|---|---|
| 1,407,775 A | | 2/1922 | Schlacks |
| 2,203,112 A | | 6/1940 | Swanson |
| 3,731,876 A | * | 5/1973 | Showalter ........................ 239/13 |
| 3,760,904 A | | 9/1973 | Luthar |
| 4,425,986 A | * | 1/1984 | Wedlin ........................... 184/3.2 |
| 4,872,502 A | * | 10/1989 | Holzman ........................ 165/299 |
| 5,236,063 A | * | 8/1993 | Nelson et al. ................... 184/3.2 |
| 6,186,411 B1 | | 2/2001 | Sich |
| 6,405,810 B1 | * | 6/2002 | Grach et al. ..................... 175/52 |
| 7,900,800 B2 | * | 3/2011 | Hassler et al. .............. 222/146.5 |
| 8,408,362 B2 | * | 4/2013 | Eadie et al. ..................... 184/3.1 |
| 2005/0236430 A1 | * | 10/2005 | Clark et al. ................. 222/146.2 |

FOREIGN PATENT DOCUMENTS

| | | |
|---|---|---|
| BE | 893171 A1 | 8/1982 |
| DE | 3119333 A1 | 12/1982 |
| EP | 0297735 A1 | 1/1989 |

* cited by examiner

*Primary Examiner* — William E Dondero
*Assistant Examiner* — Mark K Buse
(74) *Attorney, Agent, or Firm* — Bryan Peckjian; SKF USA Inc. Patent Department

(57) ABSTRACT

Device for lubricating a wheel flange of a railway vehicle based on the spraying of a pressurized jet of lubricant, comprising an electromagnetic pump with a pump body (5) in which a piston (20) is displaced, and a means (19) for guiding the piston (20) in a bore (22), the guidance means (19) including an opening (32) designed to communicate with a lubricant transfer channel (17) in the pump body (5), said opening (32) opening out into a compression chamber (23) situated in a downstream part of the bore (22), the device comprising a heating block (7) arranged so as to transfer heat energy to the lubricant before spraying.

14 Claims, 5 Drawing Sheets

LUBRICATING DEVICE AND ITS USE FOR LUBRICATING A WHEEL FLANGE OF A RAILWAY VEHICLE

BACKGROUND OF THE INVENTION

The present invention relates to lubricating devices, more particularly to a lubrication device that can be used, for example, to lubricate a wheel flange of a railway vehicle.

On a railway wheel, a distinction is made between the generally tapered rolling surface in contact with the top surface of the rail and the wheel flange. The wheels are guided on the rails in a straight line by the tapered nature of the rolling surfaces and in the curves by the wheel flange which bears on the lateral faces of the rail. The wheel flange exceeds the rolling surface by a number of centimeters, and prevents any risk of the transit car being derailed. The friction forces between the wheel flange and the lateral surface of the rail result in wear of the flange, energy losses through friction and noise.

In order to reduce these drawbacks, lubrication devices are generally provided which deposit lubricant on the wheel flange or on the lateral faces of the rails by spraying a jet of lubricant.

Current lubrication devices typically use compressed air mixed with a lubricant, this mixture being sprayed in the form of a jet produced through the intermediary of a nozzle positioned in the vicinity of the wheel flange. Such devices are, for example, described in U.S. Pat. Nos. 3,760,904 and 6,186,411. These lubrication devices increase the storage volumes needed to compress the air, which makes the air compressors installed on the motor coaches and used for other equipment relatively costly. Moreover, they do not allow the quantity of lubricant sprayed onto the wheel flange to be delivered accurately because of the non-uniform nature of the air-lubricant mixture.

Another type of lubrication device described in patent of invention BE 893171 comprises an electromagnetic pump which directly sprays the lubricant onto the flange without compressed air, which allows this pump to deliver the quantity of lubricant sprayed onto the flange with accuracy. By providing an inlet valve and an outlet valve actuated in time in a deferred manner, this pump makes it possible to suck the lubricant into a chamber and to discharge it under pressure. Nevertheless, this pump does not make it possible to spray an adequate jet of lubricant onto the wheel flange because of the viscosity of the lubricant and the path the lubricant follows in the lubrication device. Such a pump is not suited to all types of lubricant and to the variations in outside temperatures that range, for example, in certain circumstances, between −30° C. and +50° C., which alters the viscosity of the lubricant, making an accurate adjustment of the quantity of lubricant sprayed very difficult.

SUMMARY OF THE INVENTION

The present invention aims at solving these problems. In particular, the invention proposes a lubrication device making it possible to spray an accurate and easily-adjusted quantity of lubricant.

Another subject of the invention is a lubrication device of simple and compact structure.

Finally, another subject of the invention is a lubrication device in which guidance of the lubricating jet is enhanced.

The invention proposes a lubrication device based on the spraying of a pressurized jet of lubricant, comprising an electromagnetic pump with a pump body in which a piston is displaced, and a means for guiding the piston in a bore, the guidance means including an opening designed to communicate with a lubricant transfer channel, said opening opening out into a compression chamber situated in a downstream part of the bore, the device having a heating block arranged so as to transfer heat energy to the lubricant before spraying.

In one embodiment, the heating block is mounted on the pump body and is traversed by the lubricant transfer channel.

The heating block can include a lubricant storage chamber linked to the lubricant transfer channel.

A lubricant spraying nozzle can be mounted directly on the pump body, for example around an end of reduced diameter of the pump body.

In another embodiment, the heating block is mounted down-stream of the pump body.

A lubricant spraying nozzle can comprise an elongated nozzle body with a through-passage for the lubricant. The nozzle body is advantageously mounted downstream of the pump body and comes into contact with the heating block.

Preferably, the heating block includes means for attachment to the pump body and for securing the spraying nozzle in position.

In all the embodiments, the heating block is advantageously made of a heat-conducting material and includes an electric heating element.

Furthermore, the lubrication device includes an isolating plug mounted to move in a guide sleeve housed in the downstream part of said bore. The plug can be activated by an elastic means tending to displace it to the closed position. The guide sleeve can include a radial annular lip on which the isolating plug bears in the closed position.

The guidance means can advantageously be displaced with respect to the lubricant transfer channel so as to adjust the volume of the compression chamber.

In an embodiment more particularly suited to the lubrication of a wheel flange of a railway vehicle, an air baffle is positioned so as to orient an air stream toward the outlet of the spraying nozzle. The baffle can have an air sampling means comprising an air intake orifice oriented in the direction of travel of the railway vehicle.

According to another aspect of the invention, a lubrication device as mentioned hereinabove is used to lubricate at least one wheel of a railway vehicle bogie.

BRIEF DESCRIPTION OF THE SEVERAL VIEWS OF THE DRAWINGS

Other features and benefits of the invention will become apparent from reading the detailed description of an embodiment, taken by way of non-limiting example and illustrated by the appended drawings, in which.

DETAILED DESCRIPTION OF THE INVENTION

Figure 1:
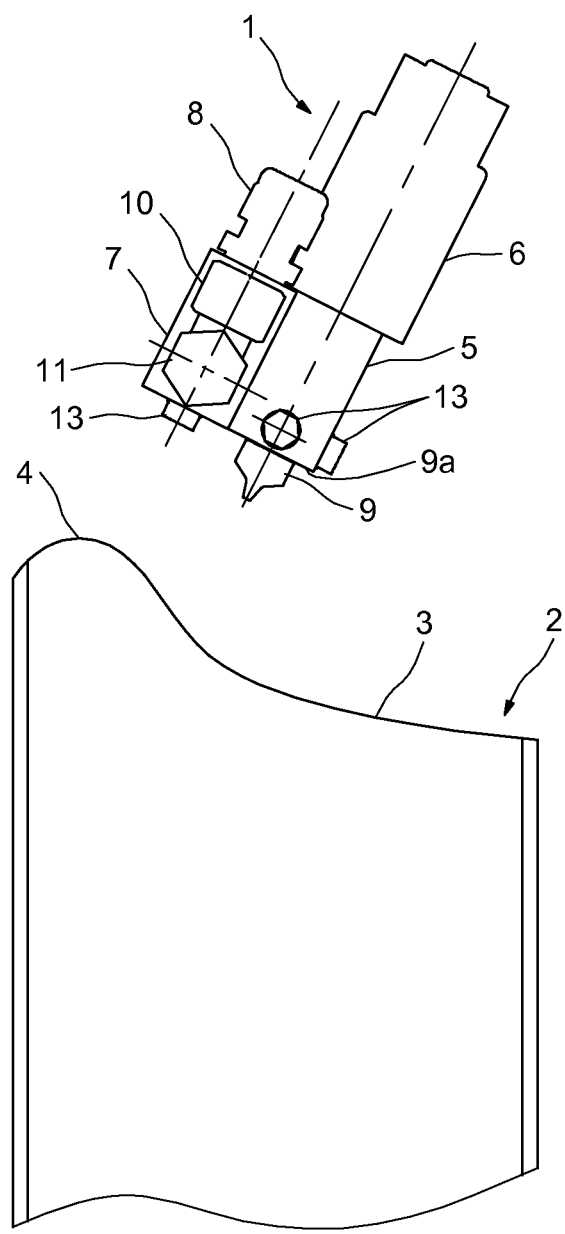
FIG. 1 represents a lubrication device according to one embodiment positioned above a wheel of the railway vehicle.

FIG. 1 represents a lubrication device 1, according to the invention, positioned above a wheel 2 of a railway vehicle that is not represented in the figures. The rail 2 has a rolling surface 3 of generally tapered form and a wheel flange 4 projecting with respect to the rolling surface 3.

The device comprises an electromagnetic pump body 5 linked to an electric actuator 6, and a heating block 7 linked to an electrical power supply 8, the heating block 7 being attached lengthwise to the length of the pump body 5. The device 1 is secured to the frame of the railway vehicle at an appropriate distance from the flange 4, the axis of the pump body 5 and of the nozzle 9 being inclined relative to the rotation axis of the wheel 2 by an appropriate angle for the lubricant to be deposited roughly at the junction of the flange 4 and the rolling surface 3. This angle can be, for example, between 45° and 65°.

Hereinafter in the description, the adjective longitudinal relates to the lengthwise direction of the pump or of the heating block, and the adjective transversal to a direction perpendicular to this length.

A nozzle 9 is positioned on the front face 9a of the pump body 5 facing the flange 4, in order to spray lubricant onto the latter.

A longitudinal connection 10 and an elbow 11 passing through the heating block 7 allow the pump body 5 to be supplied with lubricant by a lubricant tank that is not represented. An orifice that can be blocked by a screw 13 makes it possible to drain the pump body 5.

Figure 2:
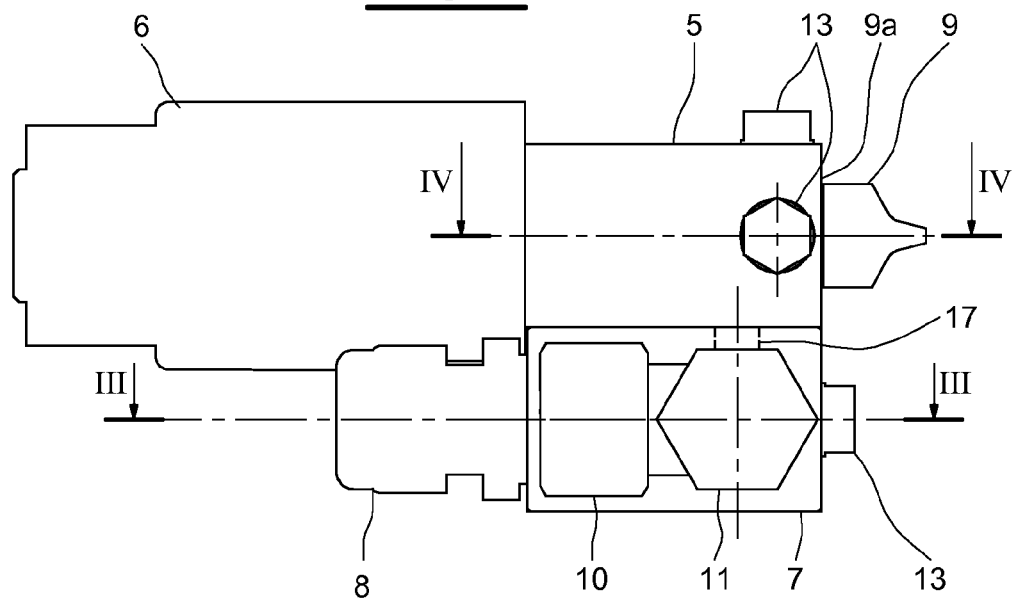
FIG. 2 diagrammatically represents the lubrication device of FIG. 1, in elevation.

FIG. 2 represents an enlarged view of the heating block 7 and of the pump body 5. Lubricant is circulated from the heating block 7 to the pump body 5 via a channel 17 linked to the transversal elbow 11.

Figure 3:
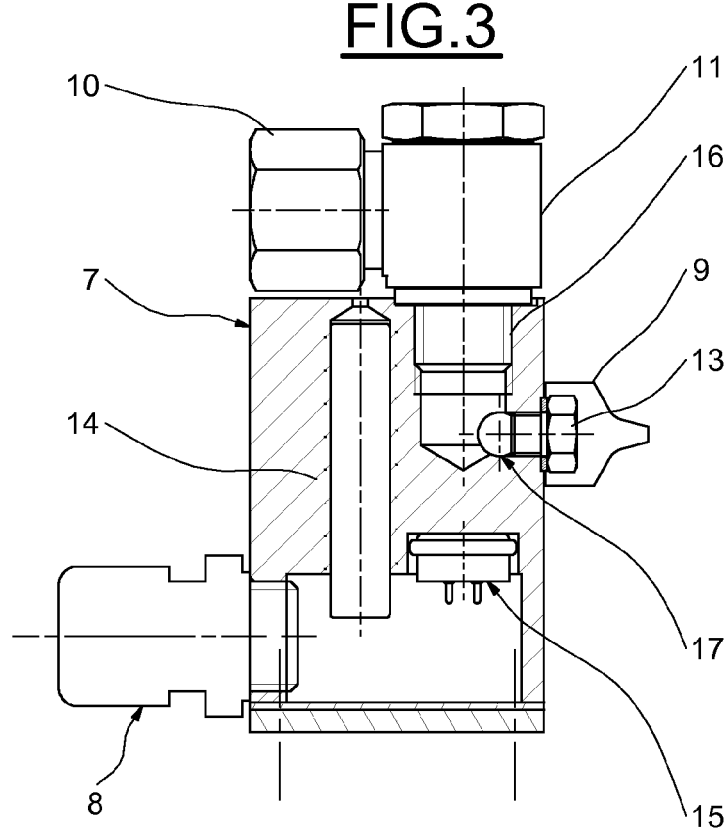
FIG. 3 diagrammatically represents a cross-sectional view of a heating block along the axis III-III of FIG. 2.

FIG. 3 represents a cross-sectional view of the heating block 7 along the axis III-III of FIG. 2.

The heating block 7 has a parallelepipedal body made of a heat-conducting material in which are housed a heating element 14 such as an electrical resistance and a thermostat 15 both connected to the electrical power supply 8. A lubricant storage chamber 16 is linked to the channel 17 conveying the lubricant into the pump body 5.

The chamber 16 is linked to the transversal elbow 11. The chamber 16 and the lubricant-conveying channel 17 make it possible to store a volume of lubricant in the heating block 7 upstream from and close to the pump body 5. Since the heating block 7 is made of a heat-conducting material, it heats the stored volume of lubricant when the heating element 14 is operating, making it possible to send a more free-flowing lubricant into the pump body 5.

The lubrication device 1 is attached to the frame of the railway vehicle so that the lubricant can flow by gravity as far as the chamber 16 of the heating block 7. The drain screw 13 allows communication between the channel 17 and the atmosphere, so as to balance the pressure inside the lubrication device 1 with the atmospheric pressure.

Figure 4:
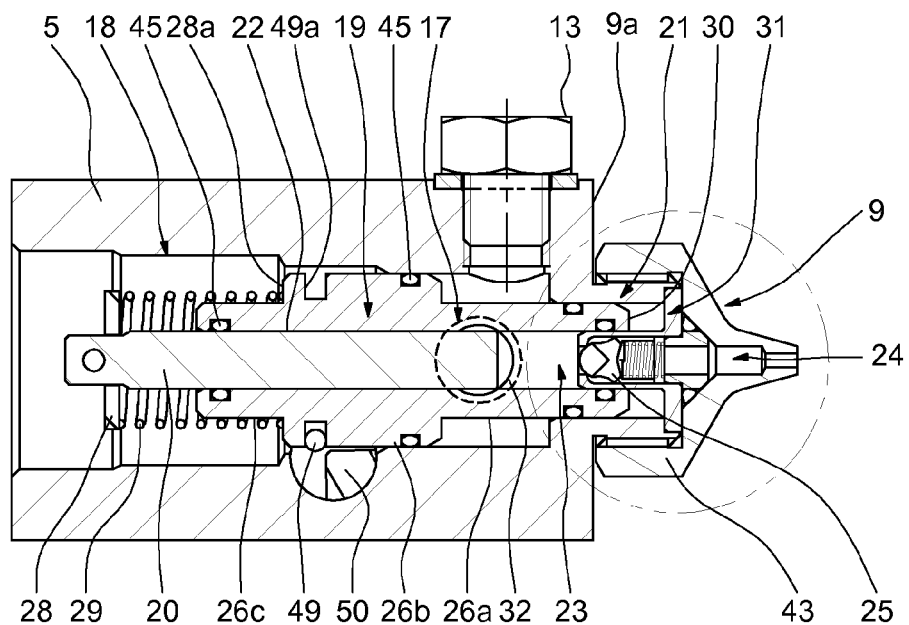
FIG. 4 diagrammatically represents an enlarged cross-sectional view along the axis IV-IV of FIG. 2 of the body of an electromagnetic pump.

FIG. 4 is an enlarged view in cross section along the axis IV-IV of the pump body 5. The pump body 5 includes a recess 18 in which is housed a means 19 of guiding a piston rod 20. The nozzle 9 is attached to an end of reduced diameter 21 of the pump body 5 projecting from the front face 9a. The guidance means 19 has a through-bore 22 linking the lubricant-conveying channel 17 represented by broken lines in FIG. 4 to a compression chamber 23. This compression chamber 23 is separated from an outlet channel 24 situated in the nozzle 9 by an isolating plug 25. The guidance means 19 is of generally cylindrical form, and includes a central part 26b situated between a front part 26a and a rear part 26c, the central part 26b having a diameter greater than that of the front 26a and rear 26c parts.

An elastic means, such as a helical spring 29, bears at one end on a washer 28 attached to the end of the piston rod 20, and at the other end on a shoulder 28a of the central part 26b. The spring 29 is used to return the piston rod 20 to an initial position with respect to the guidance means 19. A guide sleeve 31 is housed in the bore 22 at its downstream end opposite to that where the piston rod 20 leaves the bore 22 and has the spring 29. The isolating plug 25 is mounted in the guide sleeve 31 for its travel.

The compression chamber 23 corresponds to the volume situated between a transversal opening 32 in the guidance means 19 and the isolating plug 25 housed in a downstream part of the bore 22. The transversal opening 32 communicates with the lubricant-conveying channel 17.

A number of gaskets 45 are arranged in the guidance means 19 so as to ensure seal-tightness between the guidance means 19, the pump body 5 and the piston rod 20.

Figure 5:
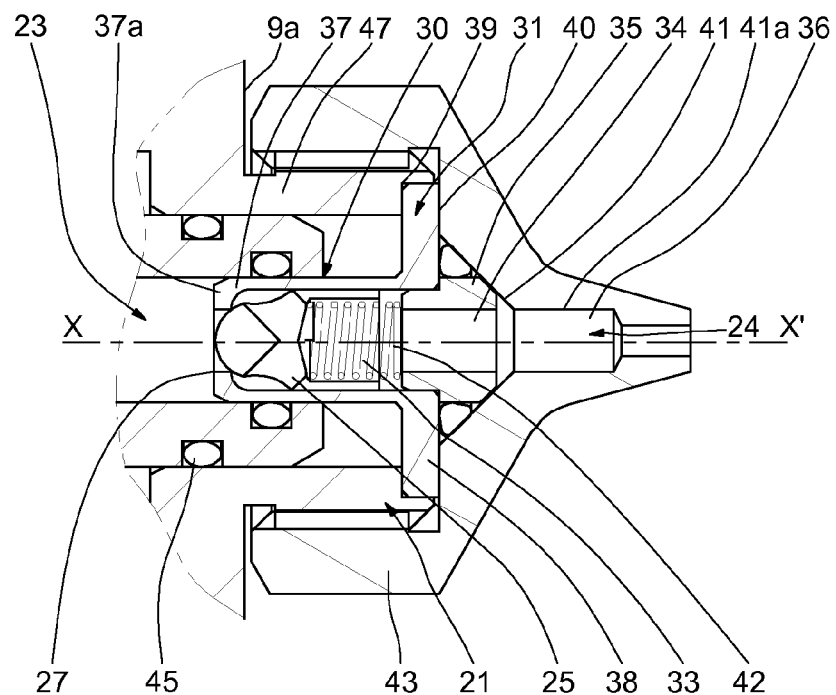
FIG. 5 diagrammatically represents an enlarged detail view of a nozzle attached to the pump body.

The elements that form the nozzle 9 can be better seen in FIG. 5 which represents an enlarged detail view of the nozzle 9. The nozzle 9 has a form that is symmetrically tapered with respect to the axis X-X' and includes a radial internal shoulder 40, a tapered area 41 and a longitudinal conduit part 41a. The nozzle 9 is attached by its tapped base 43 to the end 21 which has a threaded cylindrical surface 47 projecting from the front face 9a of the pump body 5.

The outlet channel 24 for the lubricant jet leaving the nozzle 9 is made up by the longitudinal arrangement, from the isolating plug 25, of a first passage 33 in the sleeve 31, followed by a second passage 34 in a hollow body 35 serving as a spacer between the nozzle 9 and the sleeve 31, then a third passage 36 in the nozzle 9 through which the lubricant is ejected onto the wheel flange 4.

The guide sleeve 31 is housed by a cylindrical portion 37 in the downstream end 30 of the bore 22. A radial end flange 38 bears on a shoulder of the hollow body 35, on a shoulder 39 of the end 21. The radical flange 38 also bears on the shoulder 40 of the nozzle 9. The sleeve 31 includes an orifice 27 delimited by a radial annular lip 37a. The void 27 is capable of allowing the lubricant to pass when the isolating plug 25 opens.

An elastic means such as a helical spring 42 is mounted between the hollow body 35 and the isolating plug 25 so as to stress the isolating plug in the closure direction.

The downstream end 30 of the guidance means 19 is situated at the end 21.

Figure 6A:
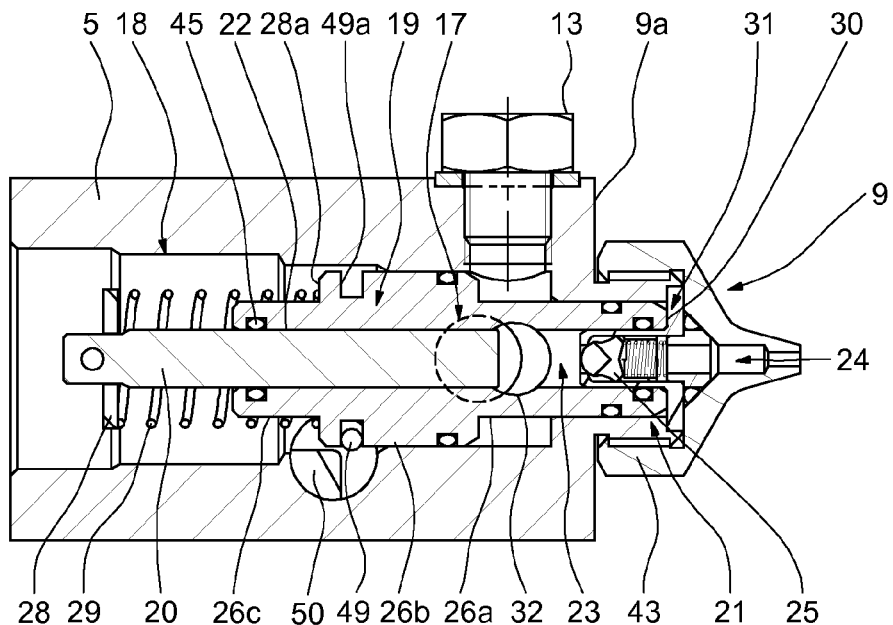
FIGS. 6a and 6b illustrate the operation of the pump.
Figure 6B:
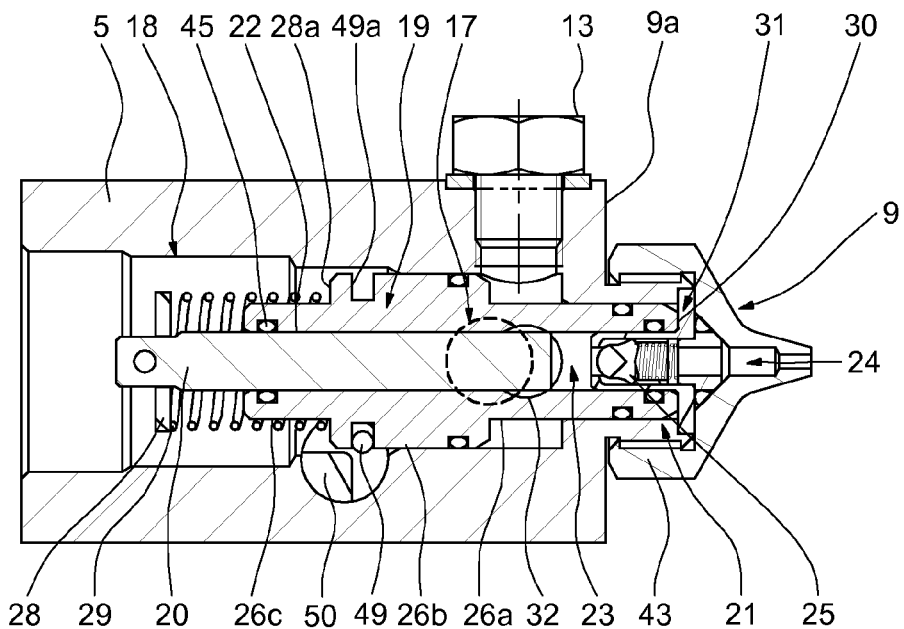

As represented in FIGS. 4, 6a and 6b, the volume of the compression chamber 23 can be adjusted by the longitudinal travel of the guidance means 19 with respect to the conveying channel 17, this travel being produced by the action of a thrust bearing 49 mounted in a groove 49a in the guidance means 19 and capable of being displaced by a cam 50.

In the position illustrated in FIG. 4, the compression chamber 23 is larger than in the positions illustrated in FIG. 6a or 6b, which results from the positioning of the transversal opening 32 closer to the conveying channel 17, the opening 32 having a section in common with and larger than the section of the lubricant conveying channel 17. FIGS. 6a and 6b show the result of a longitudinal travel of the front part 26a of the guidance means 19. The guidance means 19 has been displaced inside the pump body 5, its front part 26a being guided inside the end 21 and by its bore guided along the cylindrical surface 37 of the sleeve 31. The central part 26b is displaced longitudinally by being guided by the bore 18 of the pump body 5.

FIG. 6a shows a position corresponding to the suction of the lubricant through the conveying channel 17, the lubricant entering into the compression chamber 23 situated in the pump body 5 through the transversal opening 32 of the guidance means 19. FIG. 6b shows a position corresponding to the discharging of the lubricant out of the compression chamber 23 into the outlet channel 24 after the isolating plug 25 has opened, which follows the movement of the piston rod 20 toward the downstream part of the bore 22 situated on the right in FIGS. 6a and 6b.

In the two positions illustrated in FIGS. 6a and 6b, the guidance means 19 has been displaced relative to the position illustrated in FIG. 4, the front face 30 of the guidance means 19 coming into contact with the flange 38 of the sleeve 31. In the position illustrated in FIG. 6a, the piston rod 20 is held toward the left of the figure by the spring 29 so that the volume of the compression chamber 23 is maximum. In the position illustrated in FIG. 6b, the piston rod 20 is actuated against the force of the spring 29 by discharging the lubricant situated in the chamber 23.

The piston 20 is actuated in a conventional manner by the electric actuator 6.

Figure 7:
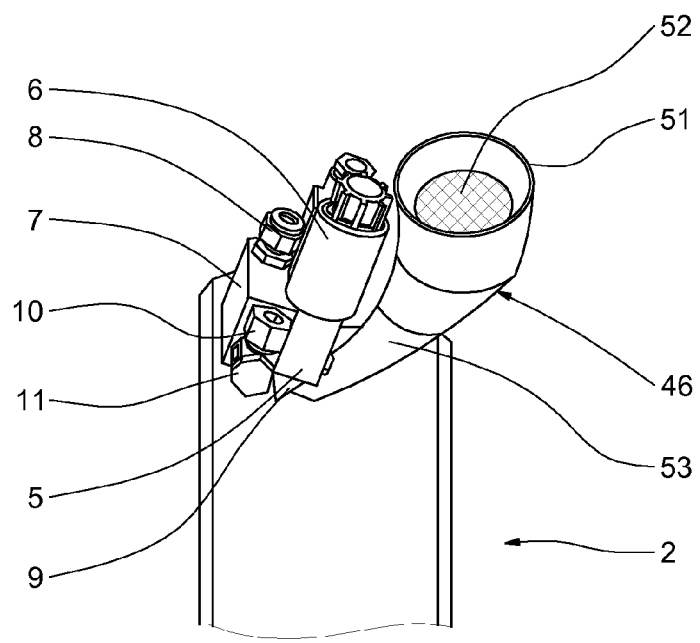
FIG. 7 represents a lubrication device according to the invention equipped with an air sampling means.

FIG. 7 represents an embodiment of a lubrication device as described hereinabove associated with an air sampling means 46 which is used to better guide the jet of lubricant at the outlet of the nozzle 9 onto the flange 4 and protect it from external air turbulences.

The air sampling means 46 comprises an air intake orifice 51 with a protection mesh 52. The orifice 51 is linked to a conduit 53 which opens out around the nozzle 9. In other words, the air sampling means 46 generates an air stream that envelopes and guides the jet of lubricant between the outlet of the nozzle 9 and the flange 4. The orifice 51 is oriented in the direction of travel of the rail transit car. Thus, as soon as the transit car reaches a sufficient speed, air is directed around the nozzle 9, in the direction of spraying of the jet of lubricant so as to enhance the guidance of the jet of lubricant. This effect increases with the speed of the transit car, which makes it possible to enhance the lubrication as the speed of the transit car increases. The air sampling means 46 that has just been described can be replaced by a simple air baffle such as a flange appropriately positioned so as to orient a flow of air toward the nozzle 9.

The heating block 7 is used to adjust the viscosity of the lubricant at the inlet of the pump body 5. The temperature of the heating block is adjusted for the lubricant to be sufficiently fluid to be sprayed in a fine jet through the nozzle 9 following the movement of the piston rod 20. The lubricant is sprayed at high speed by the travel of the piston rod 20 and reaches the wheel flange 4 by virtue of the proximity of the lubrication device to the flange 4, for example of the order of a few tens of mm.

Advantageously, the fact that the lubrication device 1 has roughly the form of a pencil reduces the length of travel of the lubricant between the lubricant storage volume and the wheel flange 4, which makes it more accurate for delivery. The heating block 7 is also used, by virtue of the chamber 16, as a buffer storage volume and is situated close to the pump body 5 to which it is linked by the lubricant-conveying channel 17. Furthermore, the nozzle 9 attached to the pump body 5 avoids having the lubricant travel through a hose at the outlet of the pump 5.

Figure 8:
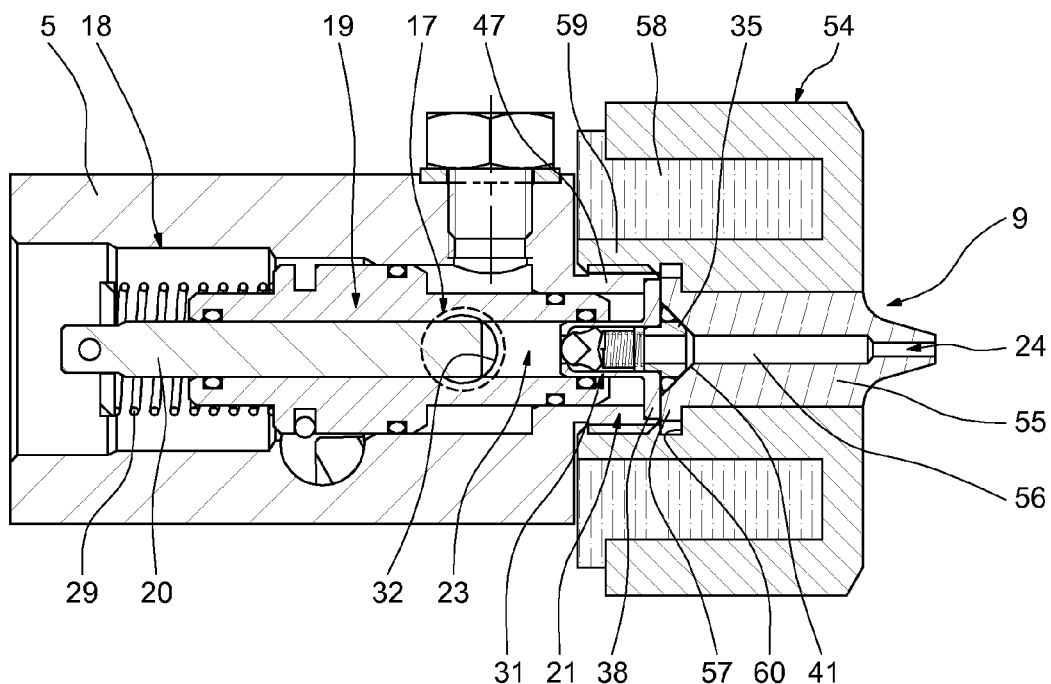
FIG. 8 diagrammatically represents in cross section the pump body of a lubrication device according to another embodiment.

FIG. 8 illustrates a second embodiment of a lubrication device according to the invention, which is distinguished from the first embodiment illustrated in the preceding figures only by the arrangement and the structure of the heating block referenced 54 in FIG. 8. In this embodiment, as is illustrated in FIG. 8, in which similar elements are given the same references as in the preceding figures, the nozzle 9 comprises an elongated nozzle body 55 with a through-passage 56 for the lubricant. The nozzle body 55 includes, at one of its ends, the actual nozzle with its outlet channel 24 and, at its other end, a peripheral shoulder 57 which can bear against the flange 38 of the sleeve 31. The nozzle body 55 also has a tapered area 41 which bears on the hollow body 35 in the same way as in the embodiment illustrated in FIG. 4.

The heating block 54 has an annular structure and surrounds the nozzle body 55 while being in contact with the latter over its entire length. The heating block 54 has an annular recess in which a heating ring 58 is mounted. The heating block 54 has a portion in the form of a tapped ring 59 which cooperates with the threaded cylindrical surface 47 projecting from the end of reduced diameter 21 of the pump body 5. Furthermore, a shoulder 60 of the heating block 54 bears on the shoulder 57 of the nozzle body 55. In this way, mounting the heating block 54 by screwing onto the end 21 of the pump body 5 makes it possible both to attach the heating block 54 to the pump body and keep in position the nozzle 9 which is thus clamped between the heating block 54 and the pump body 5 with the radial flange 38 inserted between them. During this mounting procedure, the heating ring 58 is also held against the pump body 5.

In this embodiment, the heat energy produced by the heating ring 58 is transmitted by the heating block 54, made as previously of a heat-conducting material, as far as the nozzle body 55, which makes it possible to heat up the lubricant passing through the passage 56 before its output through the orifice 24 of the nozzle 9. In this embodiment, the lubricant is therefore heated downstream of the pump body, unlike the case in the embodiment illustrated in the preceding figures, in which the heating takes place upstream of the pump body.

In all cases, the inventive device is compact and easy to put in place, notably on a railway vehicle.

Preferably, the lubrication device is positioned on the front bogie of a railway vehicle, which is in turn preferably at the front of a train. In this way, the lubricant deposited on the wheel flange at the front of the transit car or at the front of the train is partly deposited onto the rails and makes it possible to also lubricate the other wheels of the transit car and of the train.

The inventive device can also be used to lubricate other moving members operating outdoors and consequently likely to be subject to low temperatures, such as dockside cranes, materials or goods transportation systems, conveyor articulations or even elevators.

The invention claimed is:

1. A lubrication device for spraying a pressurized jet of lubricant, the device comprising:
    an electromagnetic pump with a pump body, a piston displaceable within the body, and a means for guiding the piston in a bore, the guidance means including an opening adapted to communicate with a lubricant transfer channel, the opening being coupled with a compression chamber located in a downstream pmt of the bore,
    a heating block configured to transfer heat energy to the lubricant before spraying, and further comprising an air baffle positioned so as to orient an air stream toward the outlet of the spraying nozzle such that the lubrication device is adapted for lubricating a wheel flange of a railway vehicle.

2. The lubrication device according to claim 1, wherein the heating block includes a lubricant storage chamber coupled with the lubricant transfer channel.

3. The lubrication device according to claim 1, further comprising a lubricant spraying nozzle, wherein said lubricant spraying nozzle is mounted on the pump body.

4. The lubrication device according to claim 3, wherein the pump body has an end with a diameter lesser than a diameter of a remainder of the body, the spray nozzle being mounted about the end.

5. The lubrication device according to claim 1, wherein the heating block is mounted downstream of the pump body.

6. The lubrication device according to claim 5, further comprising a lubricant spraying nozzle including an elongated nozzle body having a through-passage for the lubricant and mounted downstream of the pump body, the heating block being in contact with the nozzle body.

7. The lubrication device according to claim 6, wherein the heating block includes attachment means for securing the heating block to the pump body, wherein the attachment means also secure the spraying nozzle to the pump body.

8. The lubrication device according to one claim 1, wherein the heating block is made of a conductive material and includes an electric heating element.

9. The lubrication device according to claim 1, further comprising a guide sleeve housed in a downstream part of the bore, an isolating plug movably mounted in the guide sleeve, and an elastic means configured to bias the plug to a closed position.

10. The lubrication device according to claim 1, wherein the guidance means is displaceable with respect to the lubricant transfer channel so as to adjust the volume of the compression chamber.

11. The lubrication device according to claim 1, wherein the baffle has an air sampling means including an air intake orifice oriented in the direction of travel of the railway vehicle.

12. A lubrication device for spraying a pressurized jet of lubricant, the device comprising:

an electromagnetic pump with a pump body having an interior, the pump body including a lubricant transfer opening;

a piston guide body mounted in the pump body interior and having a piston bore, the piston bore having a first end and a second end, a portion of the piston bore at the second end forming a compression chamber, and the piston guide body including a lubricant inlet bore communicating with the piston bore;

a piston having a longitudinal axis slidably mounted in the piston bore, a first end of the piston projecting from the first end of the piston guide body into the pump body interior and a second end of the piston extending into the compression chamber;

a nozzle for spraying the lubricant;

a heating block configured to transfer heat energy to the lubricant before spraying, the pump body includes a boss extending into the mounting opening of the heating block and a portion of the nozzle is held on the pump body by the heating block, the heating block includes a mounting opening, the mounting opening is threaded, wherein the boss is threaded and wherein the heating block is screwthreadedly attached to the pump body; and a sleeve mounted in the boss, the sleeve having a flange, wherein the nozzle body includes a shoulder mounted on the flange and held against the flange by the heating block;

wherein the piston is movable in the piston bore in the direction of the piston longitudinal axis; and wherein the piston guide body is moveable in the pump body in the direction of the piston longitudinal axis and the lubricant inlet bore is movable in the longitudinal direction relative to the lubricant transfer opening.

13. The lubrication device according to claim 12, wherein the heating block is mounted on the pump body and the lubricant transfer channel traverses the heating block.

14. A method comprising lubricating at least one wheel of a railway vehicle bogie with the lubrication device according to claim 12.

* * * * *